April 11, 1961 R. A. OSWALD 2,978,991
CABLE RETAINER ON SUSPENDED FILM CARRIER
Filed July 31, 1959
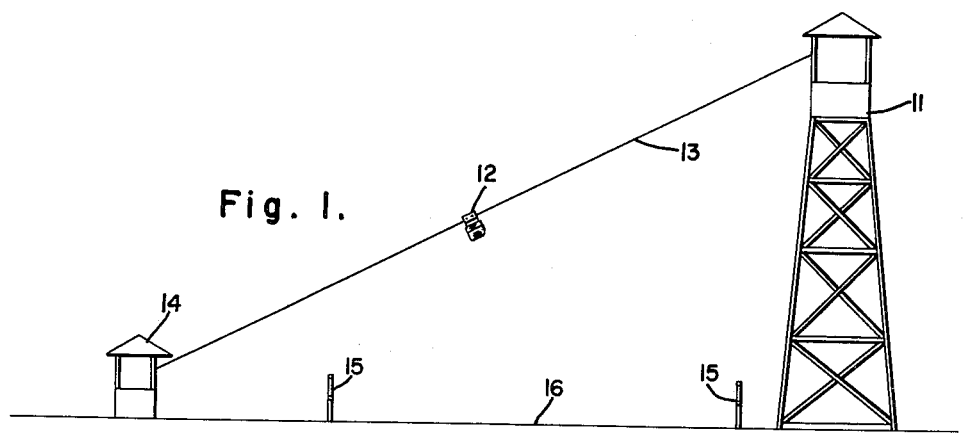
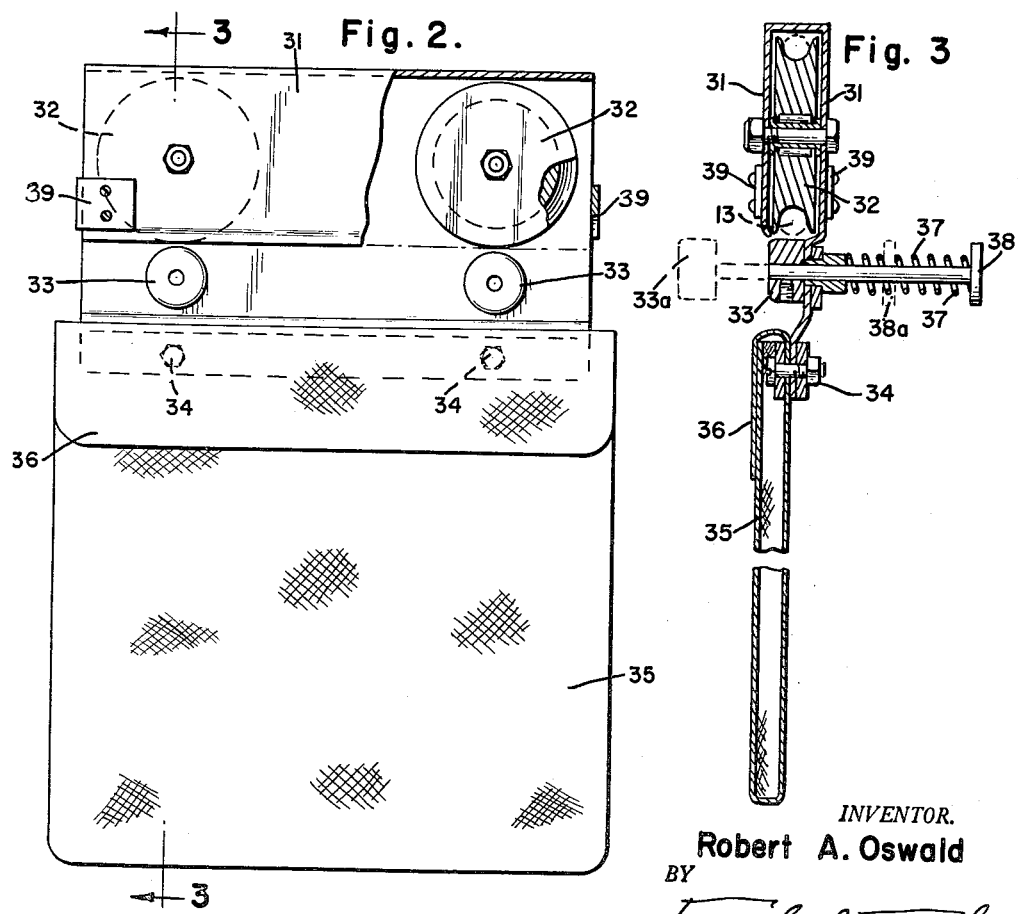
INVENTOR.
Robert A. Oswald
BY
Townsend and Townsend
attorneys 2,978,991

CABLE RETAINER ON SUSPENDED FILM CARRIER

Robert A. Oswald, 5701 W. Adams Blvd., Los Angeles 16, Calif.

Filed July 31, 1959, Ser. No. 830,780

1 Claim. (Cl. 105—151)

This invention relates to film carriers and more particularly to film carriers for transporting exposed film from camera towers along a trolley wire to film processing stations at race tracks and other such sporting areas, to facilitate quick development of the film when such is required.

The object of the invention is to provide an apparatus that will permit rapid transportation of film from one elevated point to a lower point.

Accordingly, it is a primary object of the present invention to provide a film carrier device to transport exposed film from the camera towers to the processing station, which carriers are provided with clamping mechanism insuring against improper clamping and thereby eliminating the problem of disengagement with the trolley wire during transit.

An additional object of the invention is to provide this film transport mechanism with a locking device that will prevent the mechanism from falling off or otherwise becoming disengaged from the trolley wire upon which it is traveling.

It is another object of the present invention to provide a film carrier having a clamping mechanism which can be simply and easily operated to attach and detach the carrier to the trolley wire.

Other objects and advantages will become apparent upon reference to the accompanying drawings and the following specification wherein like numerals refer to like parts throughout.

Customarily, race tracks are provided with camera towers disposed at varying intervals about the race track for the purpose of photographing different stages of a race. Many times when a phase of the race is called into question, there is a need for quick delivery of the exposed film to the processing station. A problem of long standing has been the time element involved in making such delivery by a human carrier who is required to stop at each camera tower to pick up the film and transport it to the processing station, which station is usually located on the grandstand side of the track.

To overcome this time factor, it has been found expedient to provide a mechanical carrier to transport exposed film from the tower along an inclining wire or cable to the place where the film may be developed; however, previous film carrying devices, because of improper attachment to the cable, have become detached from the cable.

The locking mechanism which maintains the transport mechanism on the trolley wire includes a spring-actuated plunging device coaxially aligned with the sheaves interposed between the frame members of the carrier bracket and spaced apart from the lowermost portion of said sheaves at a distance less than the diameter of the trolley wire wherein said plunger mechanism is movable to a release position permitting withdrawal of the trolley wire to release the carrier from the cable and is spring-actuated to locking position.

Referring now to the drawings:

Fig. 1 shows a diagrammatic view showing the invention in operation between a tower and a processing booth;

Fig. 2 is a front elevation view showing the invention device;

Fig. 3 is a side view of Fig. 2 along the line 3—3.

In Fig. 1 the device of the present invention 12 is placed on the trolley wire 13 at the tower 11 where it travels down the wire after the film has been exposed and placed in the device 12, to the processing station 14. In this figure the film in the device 12 passes over the track 16 and the inside and outside rails 15.

In Fig. 2 the device 12 is shown with a cutaway. On the housing support member 31 is placed the sheaves or pulleys 32 on which the device 12 rides on the trolley wire 13. Below the sheaves 32 is located the securing and locking means 33, which is spring tensioned and which rotates along with the sheave 32 thereby allowing the device 12 to travel downwardly on the trolley wire 13. The carrying pouch 35 is fitted with a flap 36 and is attached to the housing support means 31 by attaching means 34 which may be screws, bolts or any other such attaching means. The front and back of the housing 31 are spaced by support bracket 39.

In Fig. 3 a side view of the device of Fig. 2 along line 3—3 is shown. The housing member 31 and support bracket 39 containing the sheaves 32 below which is located the securing and locking means 33 which prevents the device from becoming disengaged from the trolley wire 13. The locking means 33 is spring loaded and held securely in place by spring 37 and released by hand pressure against plunger 38 to the position shown by the dotted lines in 33a and 38a. The pouch 35 for carrying the exposed film is provided with a closing flap 36, and pouch 35 is attached to housing 31 by securing means 34.

Although the foregoing invention has been described in some detail by way of illustration and example for purposes of clarity of understanding, it is understood that certain changes and modifications may be practiced within the spirit of the invention and scope of the appended claim.

What is claimed is:

In a cable retaining device for a pulley on a frame supporting a film carrier for movement along a downwardly inclining cable, the combination comprising: a plunger mounted in the frame, said plunger projecting outwardly on opposite sides of the frame and slidably rotatably movable in the frame; cable retaining means secured to one end of said plunger and normally maintained below the pulley to retain a cable on the pulley; an actuating knob at the other end of said plunger; a spring mounted on said plunger intermediate said knob and the outer face of the frame to return said plunger to cable retaining position, said knob actuable to push said plunger through the frame and move said cable retaining means out of cable retaining position.

References Cited in the file of this patent

UNITED STATES PATENTS

| | | |
|---|---|---|
| 801,700 | Welp | Oct. 10, 1905 |
| 1,571,096 | Rambin et al. | Jan. 26, 1926 |
| 1,958,877 | Yake | May 15, 1934 |
| 1,986,413 | Ruemelin | Jan. 1, 1935 |
| 2,644,667 | Vogel | July 7, 1953 |